(12) United States Patent
Higurashi et al.

(10) Patent No.: US 7,292,270 B2
(45) Date of Patent: Nov. 6, 2007

(54) IMAGE BLURRING CORRECTION APPARATUS

(75) Inventors: Aiko Higurashi, Saitama (JP); Kenji Hishinuma, Saitama (JP)

(73) Assignee: Fujinon Corporation, Saitama (JP)

( * ) Notice: Subject to any disclaimer, the term of this patent is extended or adjusted under 35 U.S.C. 154(b) by 765 days.

(21) Appl. No.: 10/689,950

(22) Filed: Oct. 22, 2003

(65) Prior Publication Data

US 2004/0085464 A1    May 6, 2004

(30) Foreign Application Priority Data

| Oct. 22, 2002 | (JP) | ............................. 2002-306958 |
| Mar. 31, 2003 | (JP) | ............................. 2003-094069 |
| Mar. 31, 2003 | (JP) | ............................. 2003-094070 |

(51) Int. Cl.
  H04N 5/228    (2006.01)
  H04N 5/262    (2006.01)
  G03B 17/00    (2006.01)

(52) U.S. Cl. ............................. 348/208.3; 348/208.11; 348/240.3; 396/55

(58) Field of Classification Search ............. 348/208.3; 396/55

See application file for complete search history.

(56) References Cited

U.S. PATENT DOCUMENTS

| 5,231,445 A | * | 7/1993  | Onuki et al.    | .................. 396/55    |
| 5,585,875 A | * | 12/1996 | Imafuji et al.  | ........... 348/208.2        |
| 5,598,246 A | * | 1/1997  | Miyamoto et al. | ............. 396/55         |
| 5,745,799 A | * | 4/1998  | Morofuji        | ...................... 396/55 |
| 6,148,150 A | * | 11/2000 | Yajima et al.   | ......... 348/208.99         |
| 6,473,566 B2 | * | 10/2002 | Kasuya         | ......................... 396/55 |
| 7,006,139 B2 | * | 2/2006  | Ohkawara        | .................... 348/351  |

FOREIGN PATENT DOCUMENTS

| JP | 5-142614   | 6/1993 |
| JP | 2002-229089 | 8/2002 |

\* cited by examiner

Primary Examiner—David Ometz
Assistant Examiner—Nhan Tran
(74) Attorney, Agent, or Firm—Harness, Dickey & Pierce, PLC (57) ABSTRACT

When the camera is performing the pan or tilt operation on performing image blurring correction, the image blurring correction is stopped and a vibration-proof lens is returned to a reference position at a speed that is changed according to a focal length of the zoom lens and is reduced if the zoom lens is set on a wide-side in particular so as to prevent a sense of discomfort due to swingback on the pan or tilt operation. The vibration-proof lens may be kept at a fixed position for a fixed time and returned to the reference position after the fixed time elapses so as to alleviate disorder of an image. The control subject for correcting the image blurring may be returned to the reference position by a predetermined function of which variable is time so as to exert control after stopping the image blurring correction on the pan or tilt operation suitably as intended.

4 Claims, 8 Drawing Sheets

IMAGE BLURRING CORRECTION APPARATUS

BACKGROUND OF THE INVENTION

1. Field of the Invention

The present invention relates to an image blurring correction apparatus, and in particular, to the image blurring correction apparatus for correcting (preventing) an image blurring of a camera due to vibration.

2. Description of the Related Art

For instance, as for an image blurring correction apparatus of a TV camera, there is a known one wherein a vibration-proof lens is placed to be movable within a surface perpendicular to an optical axis in an image taking optical system, and if the camera (image taking optical system thereof) is vibrated, the vibration-proof lens is driven by an actuator in a direction for counteracting the vibration so as to correct an image blurring. As for such an image blurring correction apparatus, the vibration applied to the camera is detected by a blurring detection sensor (angular speed sensor, acceleration sensor, etc.) so that a displacement amount of the vibration-proof lens for correcting the image blurring is acquired according to a blurring signal outputted from the blurring detection sensor (refer to Japanese Patent Application Publication No. 2002-229089 for instance).

The blurring signals outputted from the blurring detection sensor includes signals caused by intentional camera operation of an operator such as pan or tilt operation in addition to the signals caused by the vibration to be corrected such as a blurring caused by hand. Therefore, if the vibration-proof lens is driven merely according to the blurring signals, an image blurring correction is performed even on the pan or tilt operation. If the image blurring correction is performed on the pan or tilt operation, however, it is not desirable because the image blurring occurs after finishing the pan or tilt operation so that sense of discomfort may arise in the camera operation and image.

Thus, there is a proposal in the past as to an apparatus wherein it is automatically determined whether or not the blurring signal outputted from the blurring detection sensor is caused by the pan or tilt operation, and if determined so, the image blurring correction is stopped and the vibration-proof lens is returned to a center of a range of movement (reference position of displacement amount 0) and stopped (refer to Japanese Patent Application Publication No. 5-142614 for instance).

As for control of the vibration-proof lens on correcting the image blurring in the past cases, the blurring signal from the blurring detection sensor is filtered with an IIR filter or the like, and the vibration-proof lens is moved by rendering the result thereof as a position signal so as to correct the image blurring. On the pan or tilt operation, a filter constant is changed to return the vibration-proof lens to the reference position.

Even in the case where an image blurring correction is stopped on pan or tilt operation as described above, however, there is a problem that a phenomenon (swingback) occurs, in which an image jitters (jerks) due to operation of returning a vibration-proof lens to a position of a displacement amount 0 (reference position) as if the speed of the pan or tilt operation is instantaneously changed. The swingback does not cause so much sense of discomfort when performing the pan or tilt operation by setting a zoom on a tele-side because the images change fast. In the case where the zoom is set on a wide-side, however, there is a problem that the swingback conspicuously appears even when performing the pan or tilt operation at the same speed as when setting it on the tele-side and the sense of discomfort arises in the camera operation and image.

In the case where a filter constant in a filter such as an IIR filter is changed to return the vibration-proof lens to the reference position on the pan or tilt operation, there is a problem that, as the operation depends on the nature of the filter, it is so difficult to control the time and position that the vibration-proof lens cannot be returned to the reference position by intended control.

SUMMARY OF THE INVENTION

The present invention has been implemented in consideration of such circumstances, and its object is to provide an image blurring correction apparatus for solving the problem that the sense of discomfort due to the swingback arises on the pan or tilt operation. Another object is to provide the image blurring correction apparatus capable of exerting control after stopping the image blurring correction on the pan or tilt operation suitably as intended.

In order to attain the above-described object, the present invention is directed to an image blurring correction apparatus, comprising: an image taking optical system of a camera capable of changing a focal length; an image blurring detection device which detects an image blurring of an image formed by the image taking optical system; an image blurring correction device which displaces a shooting range of the image taking optical system according to the image blurring detected by the image blurring detection device so as to correct the image blurring; and an image blurring correction stopping device which, if determined that the camera is performing at least one of pan operation and tilt operation, stops image blurring correction by the image blurring correction device and returns the shooting range of the image taking optical system displaced by the image blurring correction device to a reference position, wherein the image blurring correction stopping device changes a speed at which the shooting range of the image taking optical system is returned to the reference position according to the focal length of the image taking optical system.

Preferably, the image blurring correction stopping device changes the speed at which the shooting range of the image taking optical system is returned to the reference position so that the speed in a case where the focal length of the image taking optical system is short is lower than the speed in a case where the focal length is long.

Preferably, the image blurring correction device displaces the shooting range by displacing a correcting lens placed in the image taking optical system within a surface perpendicular to an optical axis of the image taking optical system.

According to the present invention, in the case where it is determined that the camera is performing pan or tilt operation and the shooting range displaced by the image blurring correction device is returned to the reference position, the speed thereof is changed according to the focal length, and may be reduced if set on the wide-side in particular. Therefore, it prevents the problem that the sense of discomfort arises due to the swingback on the pan or tilt operation.

In order to attain the above-described object, the present invention is also directed to an image blurring correction apparatus, comprising: an image blurring detection device which detects an image blurring of an image formed by an image taking optical system of a camera; an image blurring correction device which displaces a shooting range of the image taking optical system according to the image blurring detected by the image blurring detection device so as to correct the image blurring; and an image blurring correction stopping device which, if determined that the camera is performing at least one of pan operation and tilt operation, stops image blurring correction by the image blurring correction device, then keeps the shooting range of the image taking optical system at a fixed position until a predetermined time elapses, and then starts to return the shooting range of the image taking optical system displaced by the image blurring correction device to a reference position after the predetermined time elapses.

Preferably, the image blurring correction device displaces the shooting range by displacing a correcting lens placed in the image taking optical system within a surface perpendicular to an optical axis of the image taking optical system.

According to the present invention, in the case where it is determined that the camera is performing pan or tilt operation and the shooting range displaced by the image blurring correction is returned to the reference position, the shooting range is kept at the fixed position until the predetermined time elapses, and so the shooting range is not abruptly displaced in a reverse direction so that disorder of the images is prevented.

In order to attain the above-described object, the present invention is also directed to an image blurring correction apparatus, comprising: an image blurring detection device which outputs a blurring signal according to an image blurring of an image formed by an image taking optical system of a camera; a filter processing device which filters the blurring signal outputted by the image blurring detection device and calculates a correcting position to correct the image blurring; an image blurring correction device which displaces a predetermined control subject for displacing an effective shooting range of the image taking optical system to the correcting position calculated by the filter processing device so as to correct the image blurring; a pan/tilt operation determination device which determines whether or not at least one of pan operation and tilt operation of the camera is performed; and a pan/tilt operation time control device which calculates the correcting position of the control subject of the image blurring correction device with a predetermined function of which variable is time if the pan/tilt operation determination device determines that the at least one of the pan operation and the tilt operation of the camera is performed, and displaces the control subject to the calculated correcting position so as to return the control subject to a predetermined reference position in a predetermined elapsed time from a moment at which it is determined that the at least one of the pan operation and the tilt operation of the camera is performed.

Preferably, the predetermined function is one of a sine function and a quadratic function.

Preferably, the control subject comprises a correcting lens which is placed in the image taking optical system and is displaced within a surface perpendicular to an optical axis of the image taking optical system so as to displace the shooting range.

According to the present invention, in the case where it is determined that the camera is performing the pan or tilt operation, the control subject for correcting the image blurring is returned to the reference position by the predetermined function of which variable is time, and so it is possible to exert control after stopping the image blurring correction on the pan or tilt operation suitably as intended.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Hereafter, preferred embodiments of an image blurring correction apparatus according to the present invention will be described in detail by referring to the attached drawings.

Figure 1:
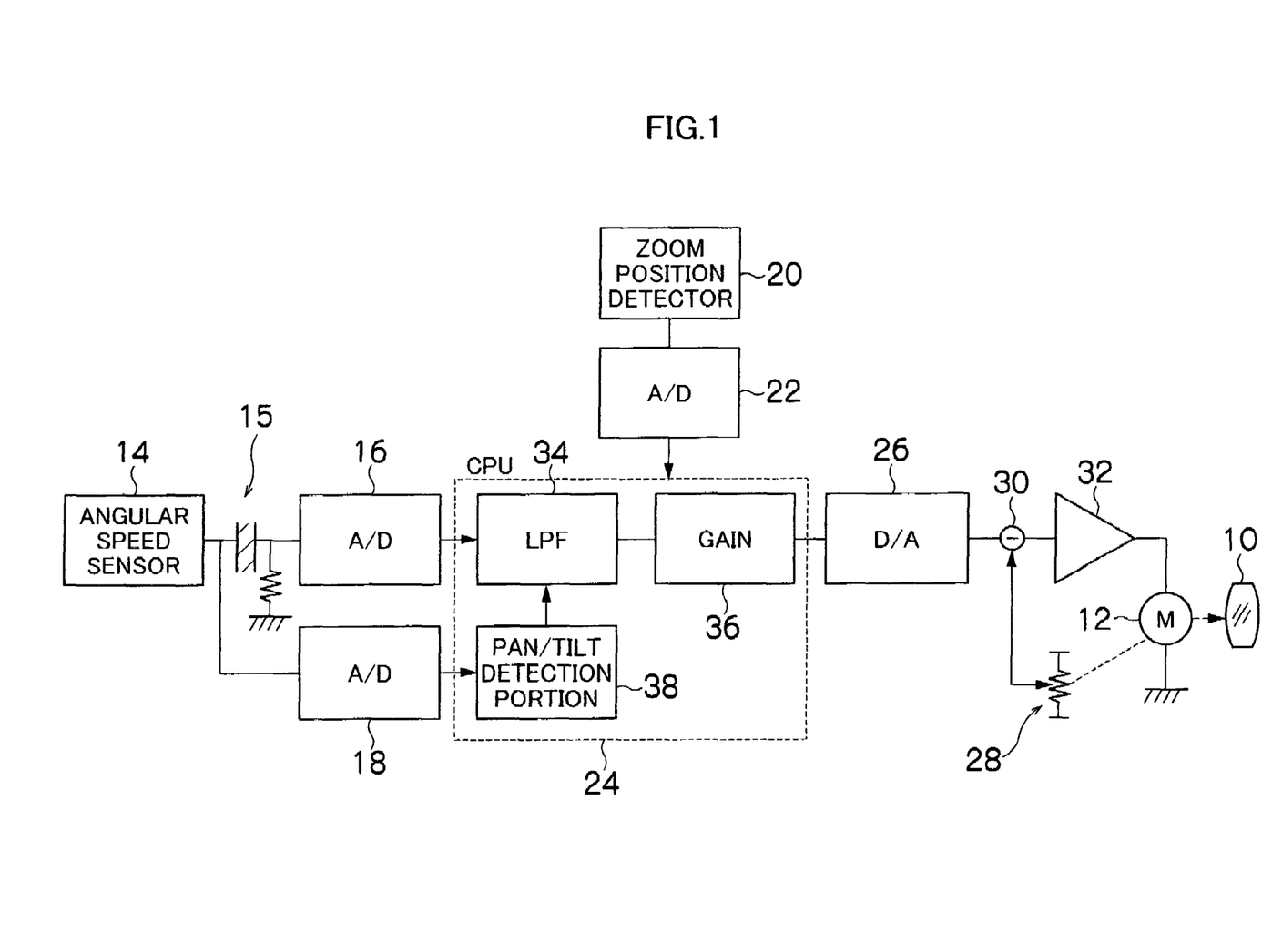
FIG. 1 is a block diagram showing an embodiment of an image blurring correction apparatus according to the present invention.

FIG. 1 is a block diagram showing the embodiment of the image blurring correction apparatus according to the present invention. The image blurring correction apparatus is mounted on a lens apparatus (taking lens) for a TV camera, a movie camera or a still camera and so on for instance. A vibration-proof lens 10 shown in FIG. 1 is placed to be movable up and down (vertical direction) and right and left (horizontal direction) within a surface perpendicular to an optical axis in the lens apparatus or an image taking optical system of the camera on which this apparatus is mounted. The vibration-proof lens 10 is driven vertically or horizontally by a motor 12, and if the camera (image taking optical system) is vibrated, it is moved by the motor 12 to a position for preventing an image blurring (position for counteracting vibration). If the vibration-proof lens 10 moves vertically or horizontally, a shooting range of the image taking optical system moves vertically or horizontally. As the vibration-proof lens 10 is driven likewise either vertically or horizontally according to the vibration generated in each direction, this embodiment will only describe a configuration for performing the image blurring correction only in one direction (hereafter, the horizontal direction), and it will have the same configuration in the other direction.

An angular speed sensor 14 shown in FIG. 1 is a gyro sensor for instance, which is used as a blurring detection sensor for detecting vibration of the camera. The angular speed sensor 14 is mounted, for example, on a top surface of a lens barrel to detect the angular speed of horizontal vibration thereof, and outputs an electrical signal of a voltage according to the detected angular speed. The signal outputted from the angular speed sensor 14 is hereafter referred to as an angular speed signal.

The angular speed signal outputted from the angular speed sensor 14 is divided into two lines. One of them has its low-frequency noise eliminated by a high-pass filter 15, and then is converted into a digital signal by an A/D converter 16, and the digital signal is given to a CPU 24. As for the other, the angular speed signal outputted from the angular speed sensor 14 is converted into the digital signal as-is by an A/D converter 18 and is given to the CPU 24.

The taking lens of this embodiment is capable of changing zoom magnification (focal length), and a detection signal of a voltage corresponding to its setup position (zoom position) is outputted from a zoom position detector 20, and is converted into the digital signal by an A/D converter 22 so as to be given to the CPU 24.

The processing contents of the CPU 24 will be described later. From the CPU 24, a position instruction signal indicating the position of the target vibration-proof lens 10, that is, a displacement amount against a reference position of the vibration-proof lens 10 is outputted to a D/A converter 26. The position instruction signal outputted to the D/A converter 26 is converted into an analog voltage signal, and then is inputted to an adder 30. The reference position of the vibration-proof lens 10 is a center of a range of movement (blurring center) for instance, and a signal value indicating the position at that time is zero. However, the reference position does not have to be the blurring center.

The adder 30 is given the voltage signal from a potentiometer 28 for detecting a rotary position of the motor 12 as a position signal indicating a current position of the vibration-proof lens 10, where the voltage signal indicating a difference between the position instruction signal from the CPU 24 and the position signal from the potentiometer 28 is generated. Then, the voltage signal is given to an amplifier (servo amplifier) 32.

The amplifier 32 amplifies the voltage signal given from the adder 30 with a predetermined gain, and applies it to the motor 12. Thus, the motor 12 is driven so that the voltage signal given from the adder 30 becomes zero, and the vibration-proof lens 10 moves to the position ordered by the position instruction signal from the CPU 24.

The processes of the CPU 24 will be described. The block of the CPU 24 in FIG. 1 shows functional blocks corresponding to the processes performed in the CPU 24, and the processes of the CPU 24 will be described as the processes of the functional blocks.

In the CPU 24, only a low-frequency component of the angular speed signal given from the A/D converter 16 is extracted by a low-pass filter 34. This process is equivalent to the process of integrating the angular speed signal. Then, the signal extracted by the low-pass filter 34 is amplified with the predetermined gain by a gain portion 36, and the signal is outputted as the position instruction signal to a D/A converter 26. The gain in the gain portion 36 is set at a value according to the zoom position obtained from the zoom position detector 20. In such processes of the CPU 24, the position instruction signal indicating the position of the vibration-proof lens 10 for correcting (preventing) the image blurring against the vibration applied to the camera, that is, the displacement amount against the blurring center of the vibration-proof lens 10 is acquired according to the angular speed signal given from the A/D converter 16, and is outputted to the D/A converter 26.

Figure 2:
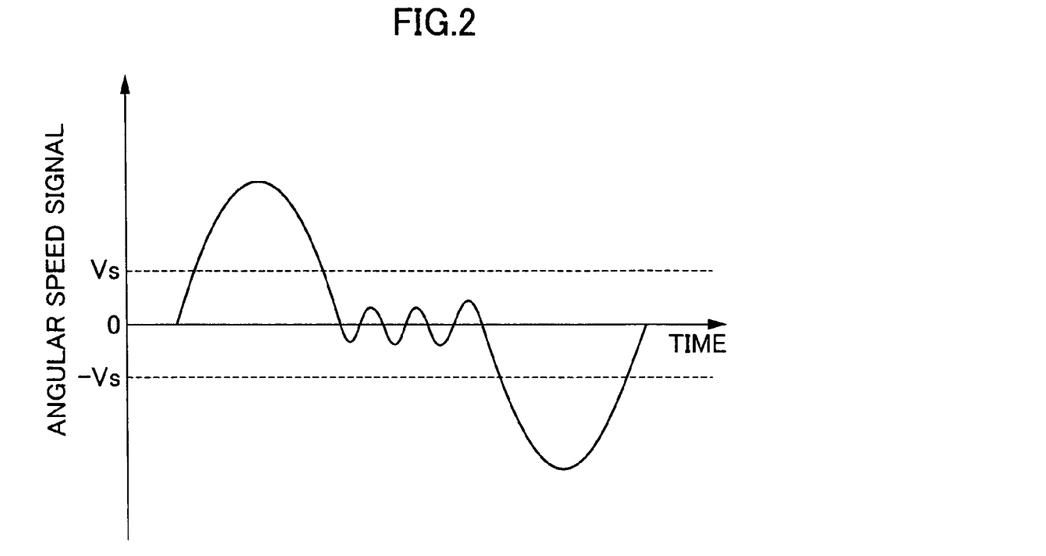
FIG. 2 is a diagram showing an example of an angular speed signal outputted from an angular speed sensor.

The angular speed signal given from the A/D converter 18 is read by a pan/tilt detection portion 38, and it is determined whether or not the angular speed signal outputted from the angular speed sensor 14 is due to a pan or tilt operation. For instance, the angular speed signal shown in FIG. 2 is obtained by the angular speed sensor 14. At this time, if it is detected that the value of the angular speed signal has become larger than a threshold $V_S$, it is determined that the angular speed signal is due to the pan or tilt operation. It is the same in the case where the value of the angular speed signal has become smaller than a threshold—$V_S$.

In the case where the pan or tilt operation is detected by the pan or tilt detection portion 38, the process for stopping the image blurring correction is performed. To be more specific, a filter characteristic of the low-pass filter 34 is changed. Here, the low-pass filter 34 is a filter capable of changing the filter characteristic by changing a parameter, and if the pan or tilt operation is detected, it is changed to the filter characteristic of returning the vibration-proof lens 10 to the reference position (blurring center) and stopping it. To be more specific, it is changed to the filter characteristic wherein the value of the position instruction signal gradually becomes closer to zero. The filter characteristic while performing the image blurring correction is a normal characteristic.

Figure 3:
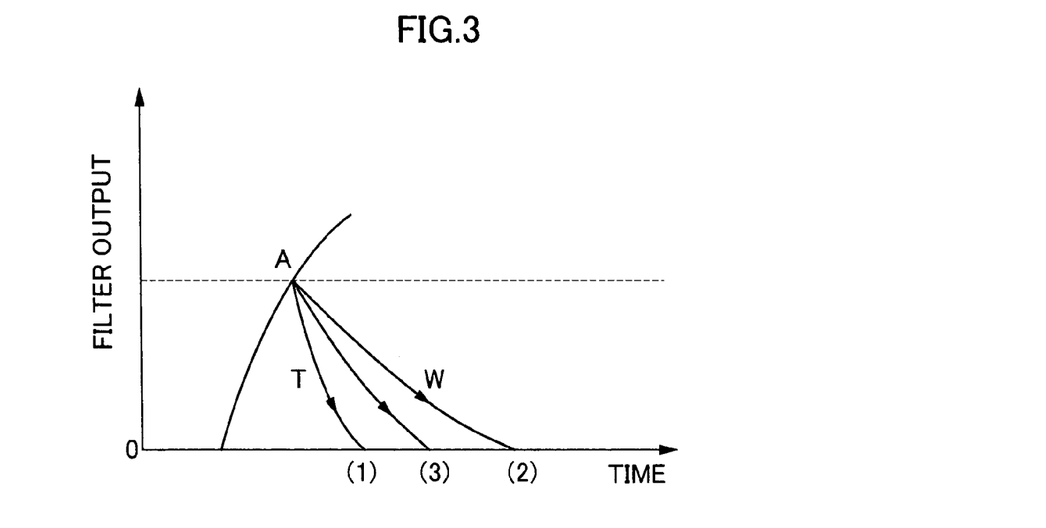
FIG. 3 is a diagram showing an example of a signal outputted from a low-pass filter.

In the case where the filter characteristic is changed from the normal characteristic to the characteristic of returning the vibration-proof lens 10 to the reference position, the value of the zoom position signal given from the zoom position detector 20 is considered. As in an example of an output signal of the low-pass filter 34 shown in FIG. 3, it is determined to be the pan or tilt operation at a point A therein and the filter characteristic is changed from the normal characteristic to the characteristic of returning the vibration-proof lens 10 to the reference position. At this time, it is set at any of the three filter characteristics having output characteristics (1) to (3) according to the zoom position.

Figure 4:
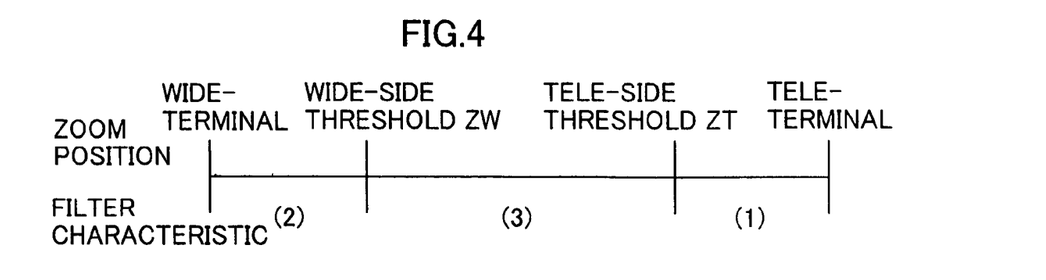
FIG. 4 is an explanatory diagram used for describing a setup of a filter characteristic.

As shown in FIG. 4, it is set at the filter characteristic of (1) in the case where the zoom position (value of the zoom position signal) is larger (tele-side) than a tele-side threshold ZT, and it is set at the filter characteristic of (2) in the case where the zoom position is smaller (wide-side) than a wide-side threshold ZW. In other cases, it is set at the filter characteristic of (3).

Therefore, when the pan or tilt operation is detected in the case where the zoom position is set closer to the wide-side, the vibration-proof lens 10 is returned to the reference position at a speed slower than the case of being set closer to the tele-side. To be more specific, the shorter the focal length is, at a slower speed the shooting range displaced by the image blurring correction is returned to the reference position. For this reason, a phenomenon of swingback conspicuous on the wide-side is prevented.

According to this embodiment, the filter characteristic is changed among the three characteristics according to the zoom position. However, it may be changed between two characteristics, or by breaking them up into a larger number of characteristics.

Figure 5:
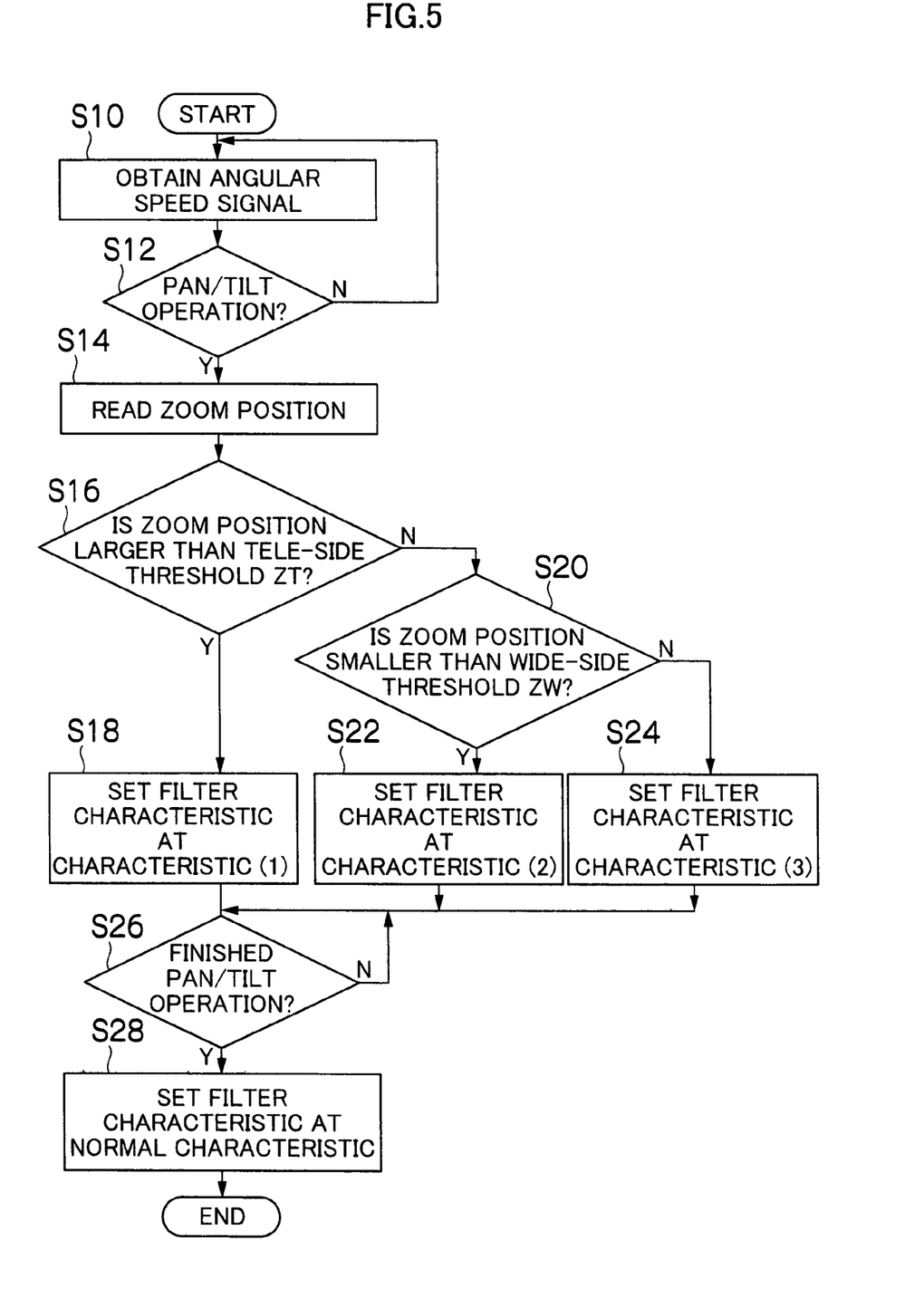
FIG. 5 is a flowchart showing a procedure of setting the filter characteristic of the low-pass filter in a CPU.

FIG. 5 is a flowchart showing a procedure of setting the filter characteristic of the low-pass filter 34 in the CPU 24. First, the CPU 24 obtains the angular speed signal given from the angular speed sensor 14 via the A/D converter 18 (step S10). Then, it determines whether or not the pan or tilt operation is performed according to the angular speed signal (step S12). In the case where it determines as NO, it repeats the processes of the steps S10 and S12. Although it is not shown in this flowchart, the CPU 24 is performing the process for correcting the image blurring even during this while.

In the case where it determines as YES in the step S12, that is, in the case where it determines that the pan or tilt operation is performed, the CPU 24 reads the zoom position (value of the zoom position signal) from the zoom position detector 20 (step S14). Then, it determines whether or not the zoom position is larger (tele-side) than the tele-side threshold ZT (step S16). In the case where it determines as YES here, it sets the filter characteristic at the characteristic of (1) (step S18).

In the case where it determines as NO in the step S16, it subsequently determines whether or not the zoom position is smaller (wide-side) than the wide-side threshold ZW (step S20). In the case where it determines as YES here, it sets the filter characteristic at the characteristic of (2) (step S22). In the case where it determines as NO in the step S20, it sets the filter characteristic at the characteristic of (3) (step S24).

Once the filter characteristic is set in any of the step S18, S22 or S24, the CPU 24 determines next whether or not the pan or tilt operation is finished (step S26). It determines whether or not the pan or tilt operation is finished, for instance, by whether or not an absolute value of the angular speed signal given from the angular speed sensor 14 via the A/D converter 18 has become smaller than a predetermined threshold. As long as it is determined as NO in the process in the step S26, the determination in this process is repeated. In the case where it determines as YES, it sets the filter characteristic at the normal characteristic on performing the image blurring correction (step S28).

While the above embodiment described the case of preventing the image blurring with the vibration-proof lens displaced within the surface vertical to the optical axis of the image taking optical system, the present invention is also applicable to the image blurring correction apparatus by another method. For instance, the present invention is also applicable to the image blurring correction apparatus using an electronic method of correcting the image blurring by shifting a range of cutting a picture signal from an image pickup device.

According to the above embodiment, whether or not it is the pan or tilt operation was determined by whether or not the angular speed signal has exceeded the predetermined value. However, it may also be determined by another method.

Figure 6:
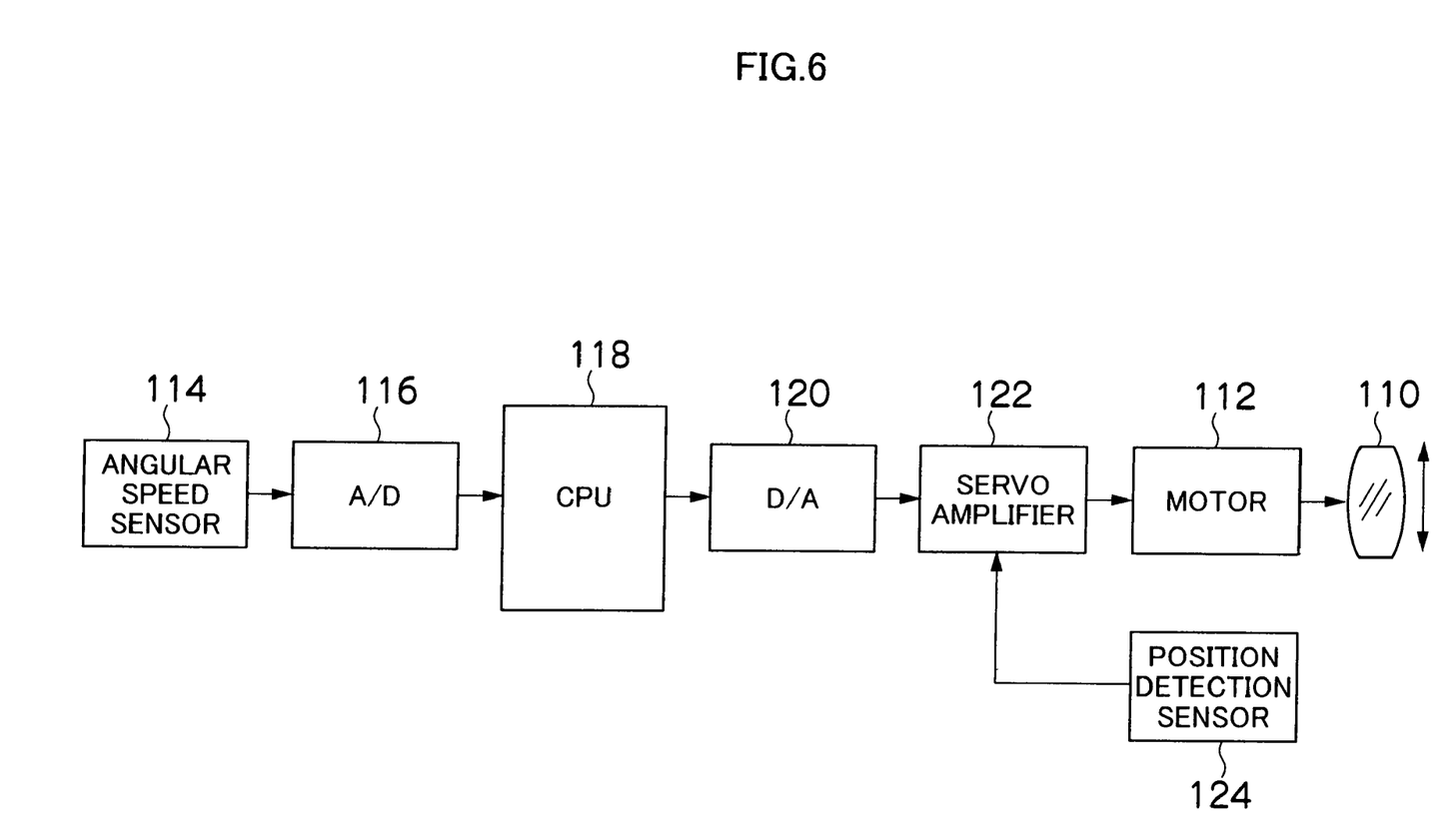
FIG. 6 is a block diagram showing another embodiment of the image blurring correction apparatus according to the present invention.

Next, another embodiment of the image blurring correction apparatus according to the present invention will be described. FIG. 6 is a block diagram showing the embodiment of the image blurring correction apparatus according to the present invention. The image blurring correction apparatus is mounted on a lens apparatus (taking lens) for a TV camera, a movie camera or a still camera and so on for instance. A vibration-proof lens 110 shown in FIG. 6 is placed to be movable up and down (vertical direction) and right and left (horizontal direction) within the surface perpendicular to the optical axis in the lens apparatus or the image taking optical system of the camera on which this apparatus is mounted. The vibration-proof lens 110 is driven vertically or horizontally by a motor 112, and if the camera (image taking optical system) is vibrated, it is moved by the motor 112 to the position for preventing the image blurring (position for counteracting the vibration). If the vibration-proof lens 110 moves vertically or horizontally, the shooting range of the image taking optical system moves vertically or horizontally. As the vibration-proof lens 110 is driven likewise either vertically or horizontally according to the vibration generated in each direction, this embodiment will only describe the configuration for performing the image blurring correction only in one direction (hereafter, the horizontal direction), and it will have the same configuration in the other direction.

An angular speed sensor 114 shown in FIG. 6 is the gyro sensor for instance, which is used as the blurring detection sensor for detecting the vibration of the camera. The angular speed sensor 114 is mounted, for example, on the top surface of the lens barrel to detect the angular speed of the horizontal vibration thereof for instance, and outputs the electrical signal of the voltage according to the detected angular speed. The signal outputted from the angular speed sensor 114 is hereafter referred to as the angular speed signal.

The angular speed signal outputted from the angular speed sensor 114 is converted into a digital signal by an A/D converter 116, and the digital signal is given to a CPU 118.

The processing contents of the CPU 118 will be described later. The CPU 118 calculates the position data indicating the target position to which the vibration-proof lens 110 should be moved according to the angular speed signal obtained from the angular speed sensor 114. Then, it outputs the position data as the position instruction signal to a D/A converter 120. Here, the position of the vibration-proof lens 110 is represented, for instance, by the displacement amount of the vibration-proof lens 110 against the reference position which is the center of the range of movement (blurring center) of the vibration-proof lens 110 for instance. According to this embodiment, the position data indicating the reference position is 0. However, the reference position does not have to be the blurring center.

The position instruction signal (position data) outputted to the D/A converter 120 is converted into an analog voltage signal, and then is inputted to a servo amplifier 122. The servo amplifier 122 is given the voltage signal from a position detection sensor 124 for detecting the rotary position of the motor 112 as the position data indicating the current position of the vibration-proof lens 110, where the servo amplifier 122 servo-drives the motor 112 so that the value of the position data indicating the target position from the CPU 118 matches with the value of the position data indicating the current position from the position detection sensor 124. Thus, the vibration-proof lens 110 moves to the position corresponding to the position data given from the CPU 118.

The processing of the CPU 118 will be subsequently described in detail. If determined that the angular speed signal obtained from the angular speed sensor 114 via the A/D converter 116 is not the signal detected due to the pan operation of the camera but is the signal generated due to the vibration to be corrected as a cause of the image blurring, the CPU 118 calculates the position of the vibration-proof lens 110 (position data indicating the target position) for correcting the image blurring by integrating the obtained angular speed signal. To be more precise, it eliminates the signal of a high-frequency component from the angular speed signal by filter processing with the IIR filter. Then, it outputs the calculated position data to the D/A converter 120 as described above. Thus, the vibration-proof lens 110 moves to the position for correcting the image blurring.

If determined that the angular speed signal obtained from the angular speed sensor 114 is the signal detected due to the pan operation of the camera, it stops the process of image blurring correction (hereafter, referred to as the image blurring correction process). Then, it starts the process for returning the vibration-proof lens 110 to the reference position 0. Hereafter, this process will be referred to as a post-correction-stop process.

Figure 7:
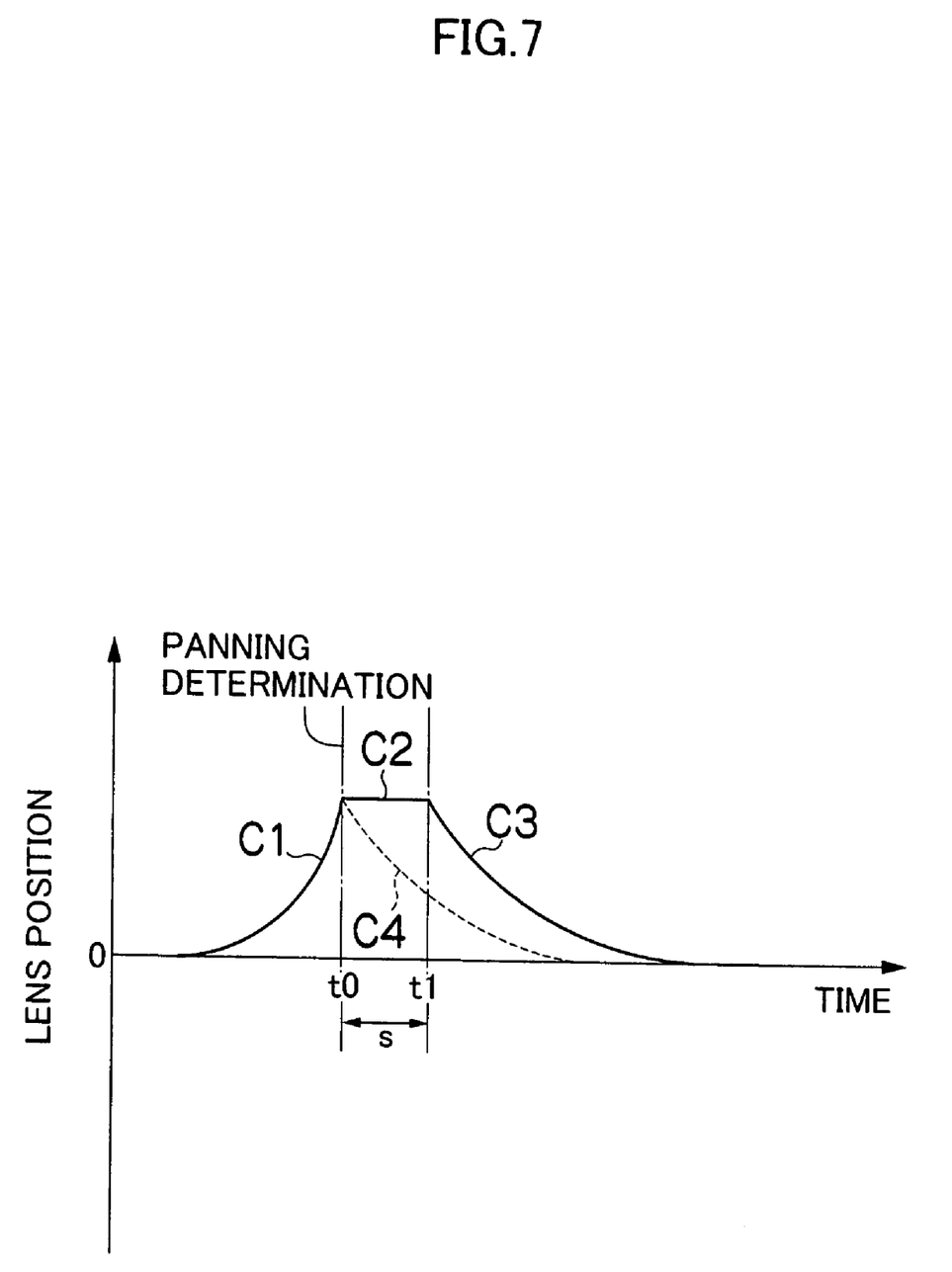
FIG. 7 is a diagram showing a movement locus of a vibration-proof lens on a pan operation of a camera.

Here, the contents of the post-correction-stop process will be described by using FIG. 7 showing a movement locus (value of the position data indicating the target position of the vibration-proof lens 110 calculated by the CPU 118) of the vibration-proof lens 110 on the pan operation of the camera. As for the time from the start of the pan operation until the time t0 in FIG. 7 (curve C1 portion), if it is not determined as the pan operation by the CPU 118 but determined as what is caused by the vibration to be corrected by the angular speed signal obtained from the angular speed sensor 114, the image blurring correction process is performed by the CPU 118 until the time t0, and the vibration-proof lens 110 moves to the target position calculated thereby.

If the value of the angular speed signal obtained from the angular speed sensor 114 exceeds the predetermined value at the time t0, the CPU 118 thereby determines that the pan operation is performed. At this time, the CPU 118 stops the image blurring correction process. Then, it first keeps the vibration-proof lens 110 at the position of the time t0 at which the image blurring correction process was stopped until a fixed time s elapses (straight line C2 portion). To be more specific, it continuously outputs to the D/A converter 120 the value of the position data outputted to the D/A converter 120 (that is, the servo amplifier 122) at the time t0.

If the fixed time s elapses from the time t0 and it becomes the time t1, the CPU 118 starts the process of gradually returning the position of the vibration-proof lens 110 to the reference position 0 from that point in time. For instance, it inputs the data of 0 rather than inputting the angular speed signal from the angular speed sensor 114 as input data of the IIR filter used on the image blurring correction process. Then, it outputs an output value of the filter process to the D/A converter 120 as the value of the position data indicating the target position of the vibration-proof lens 110. To be more specific, it changes the input data of the IIR filter to 0 with the same calculation contents as on the image blurring correction process and thereby calculates the target position of the vibration-proof lens 110. Thus, the vibration-proof lens 110 is gradually returned to the reference position 0 (curve C3 portion).

A curve C4 indicated by a broken line in FIG. 7 shows a locus on returning the vibration-proof lens 110 to the reference position by the past method. Compared to this case, this embodiment has an effect that only the image on determining that the pan operation is performed is alleviated. To be more specific, in the past cases, the vibration-proof lens 110 performs reverse operation on being determined as the pan operation so that a shift amount of the images on the shooting screen rapidly increases. As opposed to this, such a phenomenon is alleviated according to this embodiment because the vibration-proof lens 110 is kept at a fixed position for the fixed time.

Figure 8:
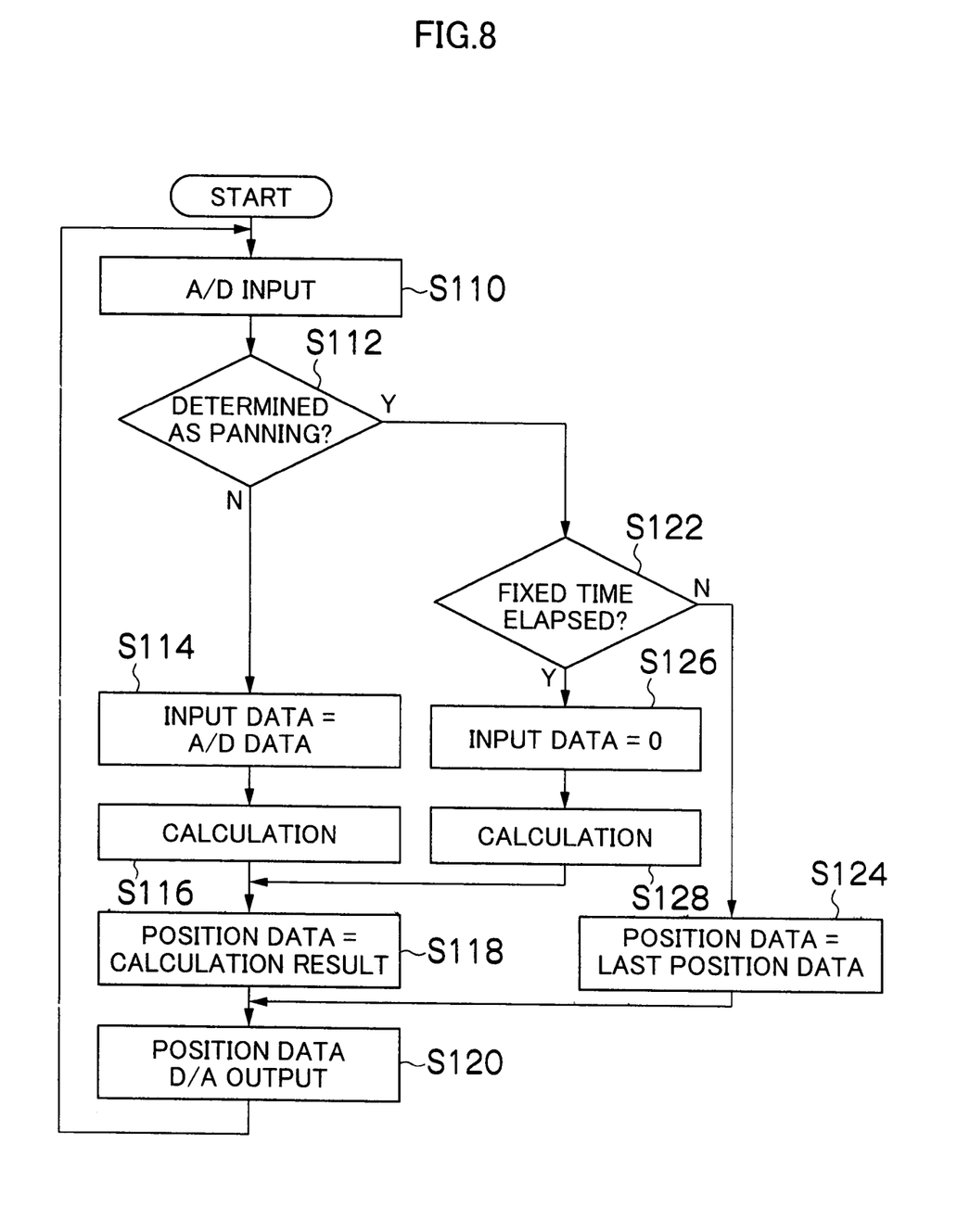
FIG. 8 is a flowchart showing a procedure of the CPU.

Next, the procedure of the CPU 118 will be described by referring to the flowchart in FIG. 8. First, the CPU 118 obtains the angular speed signal from the A/D converter 116 (step S110). Next, it determines whether or not it is panning according to the angular speed signal obtained in the step S110 (step S112). If determined as NO, it renders the angular speed signal (A/D data) obtained from the A/D converter 116 as the input data of the IIR filter (step S114). Then, it calculates the target position of the vibration-proof lens 110 by the image blurring correction process using the filter processing with the IIR filter (step S116), and renders the value of the position data outputted to the D/A converter 120 as the value of the target position calculated in the step S116 (step S118). It subsequently outputs the position data to the D/A converter 120 (step S120), and returns to the step S110.

In the case where it determines as YES, that is, it is panning in the step S112, it determines next whether or not the fixed time s has elapsed since it was determined as the panning (step S122). If determined as NO, it sets the value of the position data to be outputted to the D/A converter 120 at the value of the position data outputted last time (step S124). Then, it outputs the position data to the D/A converter 120 (step S120), and returns to the step S110. Thus, after being determined as the panning, the vibration-proof lens 110 is kept at the fixed position until the fixed time elapses.

In the case where it determines as YES, that is, it is panning and the fixed time elapsed thereafter in the step S122, it sets the input data to be inputted to the IIR filter at 0 (step S126). Then, it calculates the target position of the vibration-proof lens 110 with the filter processing of the IIR filter (step S128), and renders the value of the position data outputted to the D/A converter 120 as the value of the target position calculated in the step S128 (step S118). It subsequently outputs the position data to the D/A converter 120 (step S120), and returns to the step S110. Thus, the vibration-proof lens 110 is gradually returned to the reference position if the fixed time s elapses since it was determined as the panning.

While the above embodiment only described the control of the vibration-proof lens 110 as to the horizontal direction, the same control can also be exerted as to the vertical direction.

The above embodiment described the case of using the vibration-proof lens 110 to displace the shooting range of the image taking optical system vertically and horizontally as the device which corrects the image blurring. However, the present invention is also applicable to the cases of correcting the image blurring with other devices. For instance, it is also feasible, by displacing the range of effective pixels of the entire image pickup device vertically and horizontally, to have the effect of displacing the shooting range of the image taking optical system vertically and horizontally.

It is also possible, irrespective of the device which corrects the image blurring, to apply the process of keeping the shooting range of the image taking optical system at the fixed position until the fixed time elapses after determining it as the pan or tilt operation and gradually returning the shooting range to the reference position if the fixed time elapses.

Next, another embodiment of the image blurring correction apparatus according to the present invention will be described. As for the image blurring correction apparatus according to this embodiment, the description thereof will be omitted since it has the same configuration as in FIG. 6, and the processing contents of the CPU 118 will be described in detail hereafter by using reference numerals of the portions shown in FIG. 6. If determined that the angular speed signal obtained from the angular speed sensor 114 via the A/D converter 116 is not the signal detected due to the pan operation of the camera but is the signal generated due to the vibration to be corrected as the cause of the image blurring, the CPU 118 calculates the position of the vibration-proof lens 110 (position data indicating the target position) for correcting the image blurring by integrating the obtained angular speed signal. To be more precise, it eliminates the signal of the high-frequency component from the angular speed signal by filter processing with the IIR filter. Then, it outputs the calculated position data to the D/A converter 120 as described above. Thus, the vibration-proof lens 110 moves to the position for correcting the image blurring.

If determined that the angular speed signal obtained from the angular speed sensor 114 is the signal detected due to the pan operation of the camera, it stops the process of the image blurring correction (hereafter, referred to as an image blurring correction process). Then, it starts the process for returning the vibration-proof lens 110 to the reference position 0. Hereafter, this process will be referred to as the post-correction-stop process.

Figure 9:
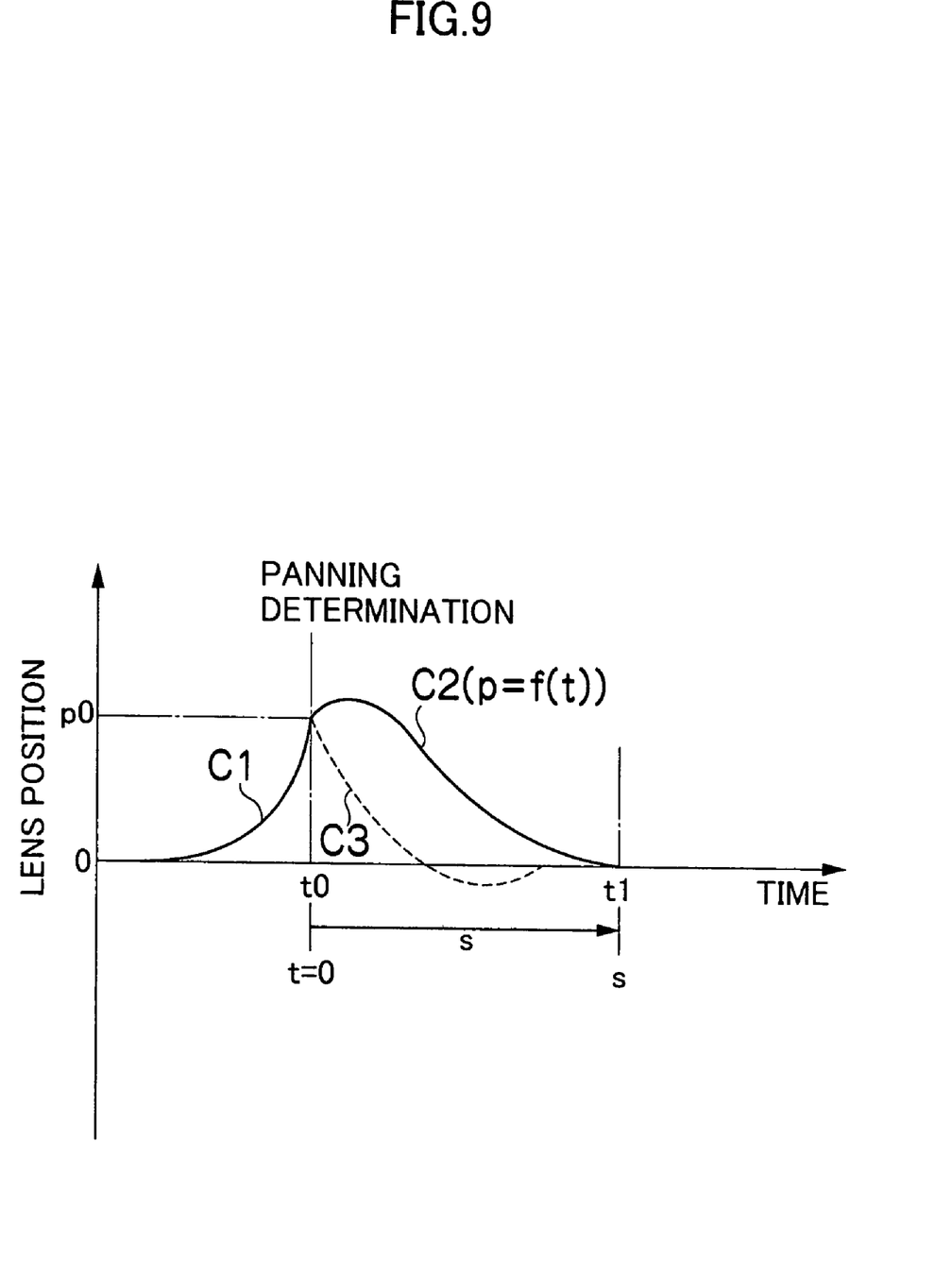
FIG. 9 is a diagram showing the movement locus of the vibration-proof lens on the pan operation of a camera.
Figure 10:
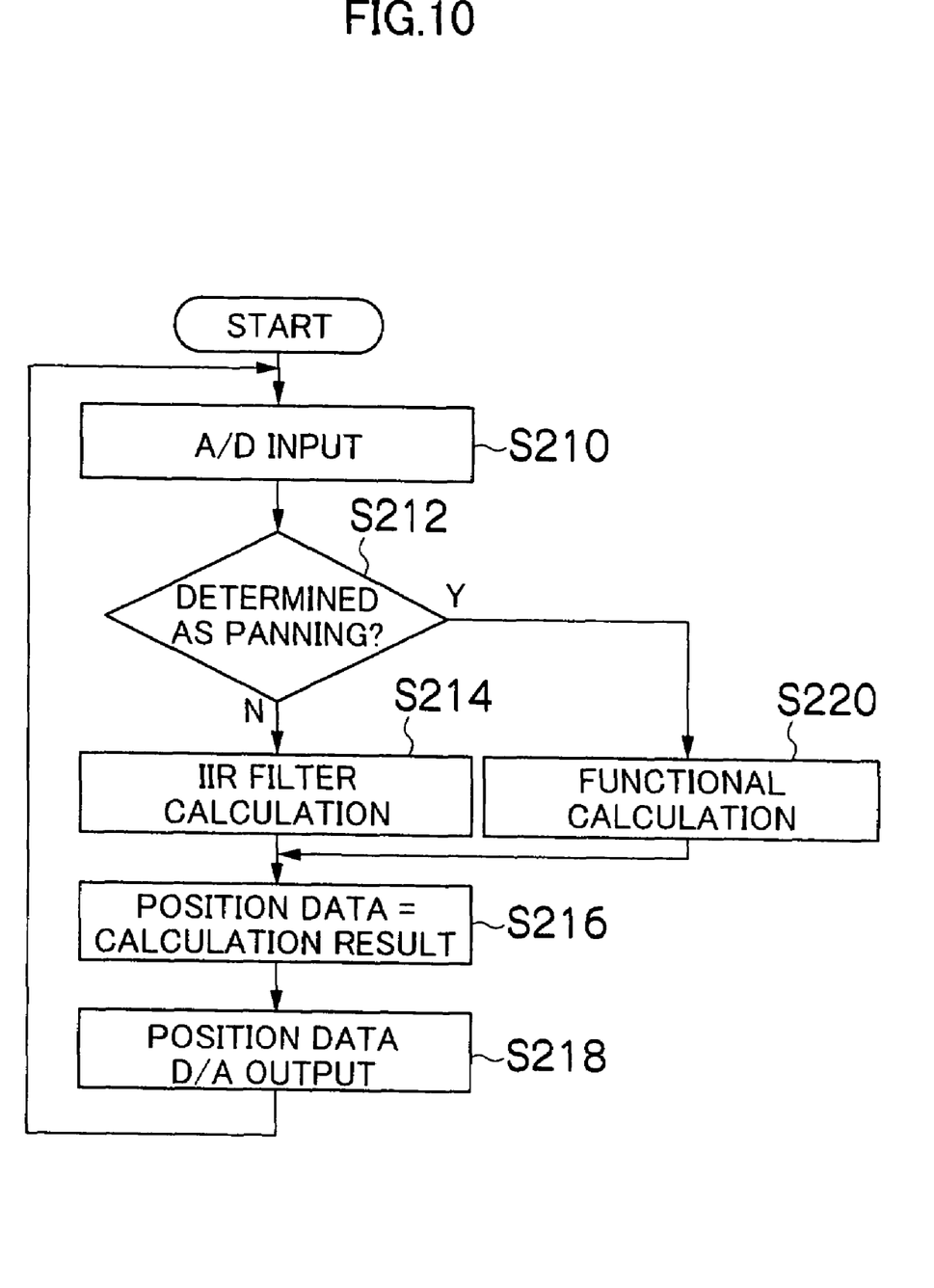
FIG. 10 is a flowchart showing the procedure of the CPU.

Here, the contents of the post-correction-stop process will be described by using FIG. 9 showing the movement locus (value of the position data indicating the target position of the vibration-proof lens 110 calculated by the CPU 118) of the vibration-proof lens 110 on the pan operation of the camera. As for the time from the start of the pan operation until the time t0 in FIG. 9 (curve C1 portion), if it is not determined as the pan operation by the CPU 118 but determined as what is caused by the vibration to be corrected by the angular speed signal obtained from the angular speed sensor 114, the image blurring correction process is performed by the CPU 118 until the time t0, and the vibration-proof lens 110 moves to the target position calculated thereby.

If the value of the angular speed signal obtained from the angular speed sensor 114 exceeds the predetermined value at the time t0, the CPU 118 thereby determines that the pan operation is performed. At this time, the CPU 118 stops the image blurring correction process. Then, it starts the process for returning the vibration-proof lens 110 to the reference position 0 from that point in time. To be more precise, it calculates the value of the position data indicating the target position of the vibration-proof lens 110 by using a predetermined function f(t) of which variable is time t, and outputs the value of the calculated position data to the D/A converter 120.

For instance, a sine function or a quadratic function is used as the function f(t). However, it may be a function of higher order than the quadratic function, an exponential function or a combination of the desired functions. As for the time t0 when determined as the pan operation, if the time variable t is 0, the position p of the vibration-proof lens 110 (position calculated by the IIR filter) is p0, a coefficient and a constant of the function f(t) are set so that f(0) when t=0 is p0, and f(s) is 0 when predetermined time t=s (time t1=t0+s). Thus, it is possible to return the vibration-proof lens 110 to the reference position 0 in scheduled precise time s from the time t0 at which it was determined as the pan operation.

The time s required to return the vibration-proof lens 110 to the reference position 0 is set at a suitable value for causing no sense of discomfort as to a shot image. For instance, it can be set according to the value of the position data p0 at the time t0 when determined as the pan operation (the larger p0 is, the larger s is rendered, for instance), or it can also be set at a fixed value.

A curve C3 shown in broken line in FIG. 9 indicates the locus of the vibration-proof lens 110 by the past method of returning the vibration-proof lens 110 to the reference position by changing a filter constant of the IIR filter. In this case, it has a drawback that it is difficult to predict the operation of the vibration-proof lens 110 and it is not possible to exert control to return the vibration-proof lens 110 to the reference position in desired time. This embodiment resolves such a drawback.

Next, the above procedure of the CPU 118 will be described in detail by referring to the flowchart in FIG. 9. First, the CPU 118 obtains the angular speed signal from the A/D converter 116 (step S210). Next, it determines whether or not it is panning according to the angular speed signal obtained in the step S210 (step S212). If determined as NO, it calculates the target position of the vibration-proof lens 110 by the image blurring correction process, that is, by filter calculation with the IIR filter (step S214), and renders the value of the position data outputted to the D/A converter 120 as the value of the target position calculated in the step S214 (step S216). Then, it outputs the position data to the D/A converter 120 (step S218), and returns to the step S210.

In the case where it determines as YES, that is, it is panning in the step S212, it calculates the target position of the vibration-proof lens 110 by the post-correction-stop process, that is, by functional calculation using the predetermined function such as the sine function or quadratic function (step S220), and renders the value of the position data outputted to the D/A converter 120 as the value of the target position calculated in the step S220 (step S216). Then, it outputs the position data to the D/A converter 120 (step S218), and returns to the step S210.

While the above embodiment only described the control of the vibration-proof lens 110 as to the horizontal direction, the same control can also be exerted as to the vertical direction.

The above embodiment described the case of using the vibration-proof lens 110 to displace the shooting range of the image taking optical system vertically and horizontally as the device which corrects the image blurring. However, the present invention is also applicable to the cases of correcting the image blurring with other devices. For instance, it is also feasible, by displacing the range of effective pixels of the entire image pickup device vertically and horizontally, to have the effect of displacing the shooting range of the image taking optical system vertically and horizontally.

As described above, according to the image blurring correction apparatus related to the present invention, in the case where it is determined that the camera is performing pan or tilt operation and the shooting range displaced by the image blurring correction is returned to the reference position, the speed thereof is changed according to the focal length, and is reduced if set on the wide-side in particular. Therefore, it prevents the problem that the sense of discomfort arises due to the swingback on the pan or tilt operation. According to another form, in the case where it is determined that the camera is performing the pan or tilt operation and the shooting range displaced by the image blurring correction is returned to the reference position, the shooting range is kept at the fixed position until the predetermined time elapses, and so the shooting range is not abruptly displaced in a reverse direction so that the disorder of the images is prevented. Furthermore, according to the other form, in the case where it is determined that the camera is performing the pan or tilt operation, the control subject (correcting lens or the like) for correcting the image blurring is returned to the reference position by the predetermined function of which variable is time, and so it is possible to exert control after stopping the image blurring correction on the pan or tilt operation suitably as intended.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image blurring correction apparatus, comprising:
   an image taking optical system of a camera capable of changing a focal length;
   an image blurring detection device which detects an image blurring of an image formed by the image taking optical system;

an image blurring correction device which displaces a shooting range of the image taking optical system according to the image blurring detected by the image blurring detection device so as to correct the image blurring; and an image blurring correction stopping device which, if determined that the camera is performing at least one of pan operation and tilt operation, stops image blurring correction by the image blurring correction device and returns the shooting range of the image taking optical system displaced by the image blurring correction device to a reference position, wherein the image blurring correction stopping device changes a speed at which the shooting range of the image taking optical system is returned to the reference position according to the focal length of the image taking optical system.

2. The image blurring correction apparatus as defined in claim 1, wherein the image blurring correction device displaces the shooting range by displacing a correcting lens placed in the image taking optical system within a surface perpendicular to an optical axis of the image taking optical system.

3. The image blurring correction apparatus as defined in claim 1, wherein the image blurring correction stopping device changes the speed at which the shooting range of the image taking optical system is returned to the reference position so that the speed in a case where the focal length of the image taking optical system is short is lower than the speed in a case where the focal length is long.

4. The image blurring correction apparatus as defined in claim 3, wherein the image blurring correction device displaces the shooting range by displacing a correcting lens placed in the image taking optical system within a surface perpendicular to an optical axis of the image taking optical system.

* * * * *